United States Patent [19]
Arimura et al.

[11] 3,953,882
[45] Apr. 27, 1976

[54] SYSTEM FOR RECORDING AND REPRODUCING A COLOR TELEVISION SIGNAL

[75] Inventors: Ichiro Arimura, Kyoto; Hiroshi Taniguchi, Hirakata; Kunio Sekimoto, Daito, all of Japan

[73] Assignee: Matsushita Electric Industrial Company, Ltd., Osaka, Japan

[22] Filed: Aug. 29, 1974

[21] Appl. No.: 501,431

[30] Foreign Application Priority Data
Sept. 7, 1973 Japan............................ 48-101337

[52] U.S. Cl. .................................................. 358/8
[51] Int. Cl.² ......................................... H04N 9/02
[58] Field of Search.......................... 358/8; 360/36

[56] References Cited
UNITED STATES PATENTS
3,704,341  11/1972  Fujita..................................... 358/8
3,820,154   6/1974  Faroudja et al........................ 358/8
3,845,497  10/1974  Inoue et al............................. 358/8

Primary Examiner—George H. Libman
Attorney, Agent, or Firm—Stevens, Davis, Miller & Mosher

[57] ABSTRACT

In a system for cancelling time axis variations introduced into a frequency converted chrominance signal converted into a lower frequency range in the recording and reproduction of a color television signal with a small-size video tape recorder, in which system the cancellation of the time axis variations is effected by using a continuous reference signal obtained through an APC heterodyne system, the center frequency of oscillation of an APC oscillator is made $n/m$ times the subcarrier frequency $f_s$ of the lower frequency converted chrominance signal ($m$ and $n$ being integers and $n>m$), and the reproduced frequency converted chrominance signal is heterodyned with a signal obtained by heterodyning a continuous signal obtained by dividing the frequency of the output signal of the oscillator by $n/m$ in the presence of a steady reference signal at the same frequency as the standard color subcarrier frequency to thereby obtain the cancellation of the time axis variations.

11 Claims, 7 Drawing Figures

FIG. 1 PRIOR ART

RECORDING PROCESS

PLAYBACK PROCESS

SYSTEM FOR RECORDING AND REPRODUCING A COLOR TELEVISION SIGNAL

This invention relates to improvements in the APC heterodyne system for cancelling time axis variations occurring in the recording and reproduction of a color television signal, for instance, with a small-size video tape recorder.

In the prior-art color television signal recording and reproducing system based on the so-called lower frequency conversion system, the higher the loop gain of the APC loop, the better the time axis variation cancellation effects that can be obtained. However, increasing the loop gain has led to deterioration of the temperature stability of the loop. This is particularly significant when dealing with the PAL color television signal where the working frequency range of the variable frequency oscillator of the APC loop is restricted to one half that of the NTSC signal, requiring sufficient considerations of the temperature stability.

An object of the invention is to provide a time axis variation cancellation system, which allows an improvement in both loop gain and temperature stability of the APC loop or an improvement in one of these two characteristics without sacrifice in the other.

According to the invention, the center frequency of oscillation of an APC oscillator is made $n/m$ times the sub-carrier frequency $f_s$ of the frequency converted chrominance signal converted to a lower frequency range ($m$ and $n$ integers and $n>m$), and the reproduced frequency converted chrominance signal is heterodyned with a signal obtained by heterodyning a continuous signal obtained by dividing the frequency of the output signal of the oscillator by $n/m$ in the presence of a steady reference signal at the same frequency as the standard color sub-carrier frequency to thereby obtain cancellation of the time axis variations. In this way, the loop gain of the APC circuit can be increased by $n/m$ times compared to the conventional system where the center frequency of oscillation of the APC oscillator is $f_s$ without deteriorating the temperature characteristic, thus obtaining improved APC characteristics. Also, by making the center frequency of oscillation of the APC oscillator $(n/m)kf_s$ (where $k<1$) and heterodyning the reproduced frequency converted chrominance signal with a signal obtained by heterodyning a continuous signal obtained by dividing the oscillation frequency of the oscillator by $n/m$ in the presence of a steady reference signal at a frequency of $f_c + (1-k)f_s$ for cancellation of the time axis variation component, the temperature characteristics can be improved without any sacrifice in the APC loop gain.

In order for the invention to be more fully understood, its construction and effects will now be described in comparison with the prior-art system, reference being made to the accompanying drawing, in which.

Figure 1:
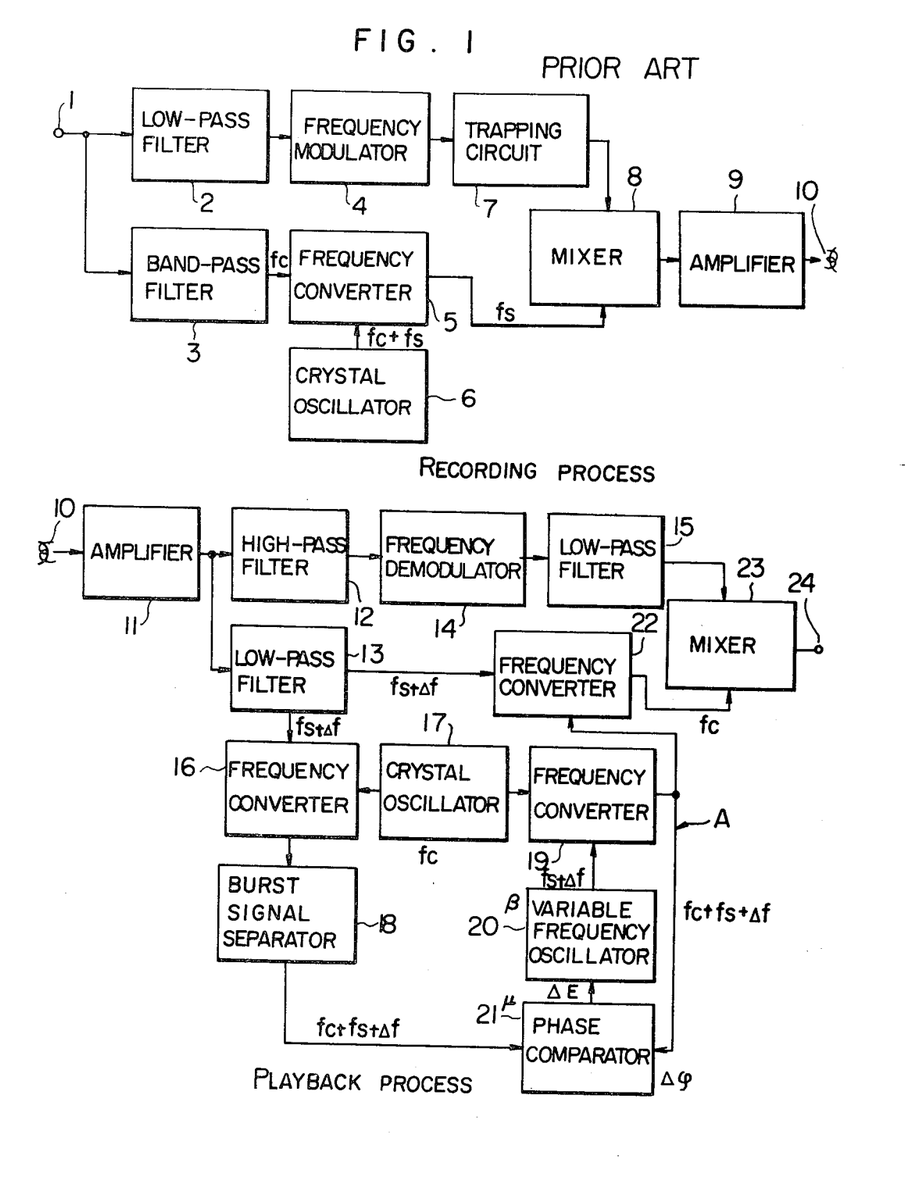
FIG. 1 is a block diagram showing a prior-art time axis variation cancellation system.

A method of removing time axis variations introduced when a color television signal is recorded and reproduced with a small size video tape recorder by using the APC heterodyne system will now be discussed with reference to FIG. 1. The system shown in FIG. 1 is generally termed a lower frequency conversion system. A composite color television signal added to an input terminal is coupled to a low-pass filter 2 and a band-pass filter 3 for separating the luminance signal and the chrominance signal. The luminance signal is frequency modulated in a frequency modulator 4, whose output is coupled to a trapping circuit 7 for removal of low frequency components before being coupled to a mixer 8. Meanwhile, the chrominance signal (at a color sub-carrier frequency $f_c$) is coupled to a frequency converter 5, to which a crystal oscillator 6 with an oscillation frequency of $(f_c + f_s)$ is connected, for frequency conversion into a signal at sub-carrier frequency $f_s$. The output of the frequency converter 5 is combined with the luminance signal output of the trapping circuit 7 in the mixer 8, whose output is in turn coupled through a recording amplifier 9 to a magnetic head 10 for recording on a magnetic tape. In playback, the signal reproduced through the magnetic head 10 and reproducing amplifier 11 is coupled to both high-pass filter 12 and low-pass filter 13 to separate the luminance signal component and frequency converted chrominance signal component respectively. The luminance signal output of the high-pass filter 12 is coupled through a frequency demodulator 14 and a low-pass filter 15 to a mixer 23. Meanwhile, the output of the low-pass filter 13, which contains a time axis variation component $\Delta f$, that is, whose sub-carrier frequency is $(f_s + \Delta f)$, is frequency converted in a frequency converter 16 with an output signal of a crystal oscillator 17 oscillating at $f_c$, and the resultant output $(f_c + f_s + \Delta f)$ is led to a burst signal separator 18 to separate the burst signal and then is led to a phase comparator 21. The output of the crystal oscillator 17 (at the oscillation frequency $f_c$) is also coupled to a frequency converter 19, to which an output signal (at frequency $f_s$) of a variable frequency oscillator 20 is also added. The phase comparator 21 compares the burst signal and a continuous signal A (at frequency $f_c + f_s$) produced from the frequency converter 19 to produce an error signal output, and this output is used to control the frequency and phase of variable frequency oscillator 20. As the oscillation frequency of the variable frequency oscillator 20 is thus controlled to $(f_s + \Delta f)$, the frequency of the continuous signal A becomes $(f_c + f_s + \Delta f)$ to obtain balance with the burst signal. This function of frequency and phase control is generally termed APC. By using this continuous signal A for heterodyning the reproduced frequency converted chrominance signal (at sub-carrier frequency $(f_s + \Delta f)$) the original chrominance signal at a sub-carrier frequency $f_c$ and free from time axis variation component can be obtained. This chrominance signal from frequency converter 22 is combined with the demodulated luminance signal in a mixer 23 to obtain the reproduced color television signal at an output terminal 24.

Figure 2A:
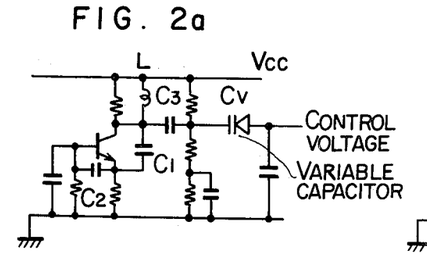
FIGS. 2a and 2b are circuit diagrams of an example of the variable frequency oscillator and an equivalent circuit thereof.

Denoting now the phase comparison sensitivity of the phase comparator 21 by $\mu$(V/rad.), the frequency variation sensitivity of the variable frequency oscillator 20 by $\beta$(Hz/V), the phase difference between the burst signal and continuous signal A by $\Delta\phi$(rad.) and the error signal output voltage of the phase comparator 21 by $\Delta E$(V), the following relations hold $$\Delta E = \mu \cdot \Delta \phi \qquad (1)$$

and $$\Delta f = \beta \cdot \Delta E = \mu\beta \cdot \Delta\phi \qquad (2)$$

so the APC loop gain is $\mu\beta$. Since the crystal oscillator 17 is sufficiently stable with respect to temperature, the temperature stability of the APC loop depends upon the temperature stability of the variable frequency oscillator 20, and the latter is thought to be substantially proportional to the oscillation frequency $f_s$. For example, if the oscillator has the construction shown in FIG. 2a, with $f_s = 767$ kHz the variation of the oscillation frequency with a temperature change of from −10°C to 60°C is about 1.5 kHz.

Where an NTSC color television signal is recorded and reproduced in the above system, frequency variations within ±1.5 kHz in the variable frequency oscillator will be permissible for the follow characteristics of the variable frequency oscillator with respect to the frequency variations of the reproduced chrominance signal and may be made to be about 12 kHz in the pull-in range and 20 kHz in the hold range. However, in the case of a PAL color television signal, where the burst signal phase is shifted 90° for each horizontal scan line, both pull-in and hold ranges are reduced to about one half compared to the case of the NTSC signal, so that temperature stability is very significant.

The temperature stability may be improved by reducing the oscillation frequency of the variable frequency oscillator 20 while increasing by that much the steady reference frequency of the oscillator 17 for heterodyning with the variable frequency oscillator output. By so doing, however, the frequency variation sensitivity of the variable frequency oscillator is reduced, leading to a reduction of the APC loop gain to an impractical extent. Also, aside from the temperature characteristics, the greater the APC loop gain, the better the time axis variation cancellation characteristics that can be obtained.

Figure 2B:
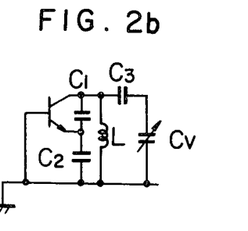

The instant invention is predicated in providing a method of bettering the APC loop gain without deteriorating the temperature stability of the loop or of bettering the temperature stability of the APC loop without sacrifice in the gain thereof or of bettering both gain and temperature stability of the APC loop. Before describing the invention in detail, the frequency variation sensitivity of the variable frequency oscillator will be discussed. For the variable frequency oscillator used in video tape recorders stability of the oscillation frequency and a broad variable frequency range are required. Accordingly, it is the practice to use Colpitts or Harley type LC oscillators controlled by variable reactance elements such as variable capacitance diodes. FIGS. 2a and 2b show an example of the variable frequency oscillator (Colpitts oscillator) and an equivalent circuit thereof. From FIG. 2b, the oscillation frequency $f$ and frequency variation sensitivity $$df/dC_r \left( \beta = \frac{df}{dC_r} \cdot \frac{dC_r}{dE}, \frac{dC_r}{dE} \text{ being constant} \right)$$

are $$f = \frac{1}{2\pi \sqrt{L \left( \frac{C_1 C_2}{C_1 + C_2} + \frac{C_3 C_r}{C_3 + C_r} \right)}} \qquad (3)$$

and $$\frac{df}{dC_r} = - \frac{\pi f^2 C_3^2}{(C_3+C_r)^2} \sqrt{\frac{L}{\frac{C_1 C_2}{C_1+C_2} + \frac{C_3 C_r}{C_3+C_r}}} \quad (C_3 >> C_r) \qquad (4)$$

When varying the self-running frequency of the oscillator the value of $L$ or $C$ is varied, and in this case it is practical in view of the stability of oscillation to make $L/C$ constant. In this case, the frequency variation sensitivity $df/dC_v$ is proportional to the square of the oscillation frequency $f$, as is apparent from equation 4.

Figure 3:
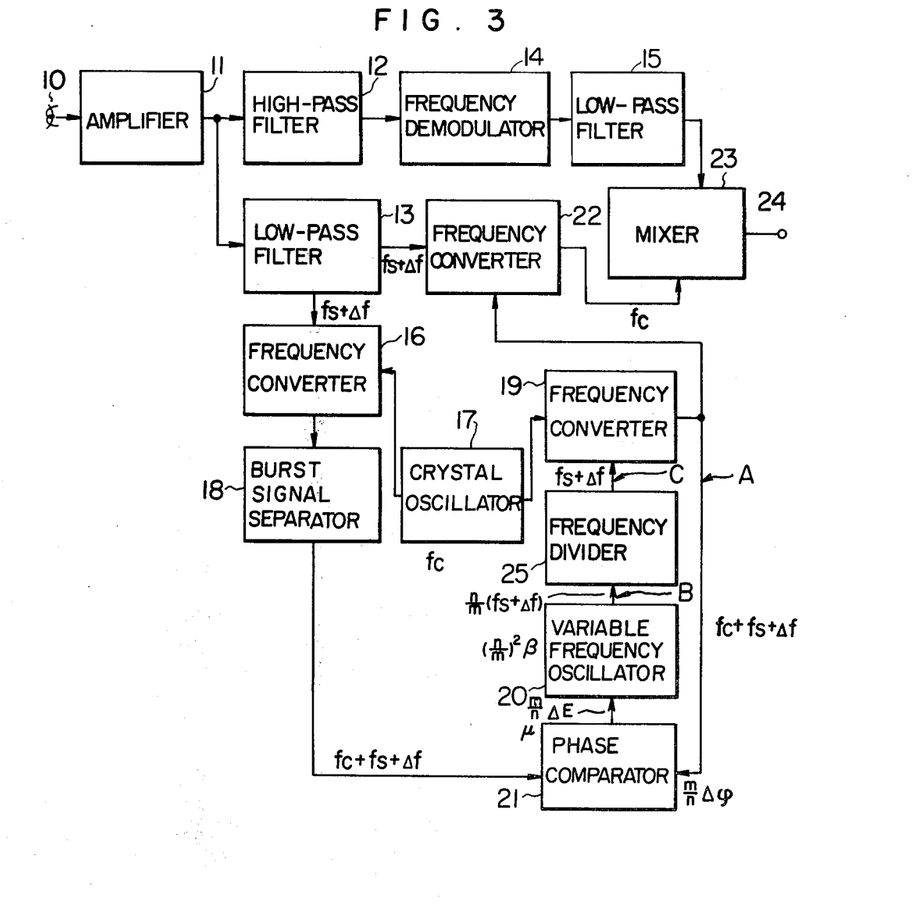
FIGS. 3 to 6 are block diagrams showing embodiments of the invention.

The invention will now be described by using the above results. FIG. 3 shows a block diagram of an embodiment of the invention (more particularly, only the reproducing system of the embodiment). Parts 10 to 24 in FIG. 3 are the same as and have substantially the same function as those of the same reference numerals in FIG. 1. Similar to the case of FIG. 1, the chrominance signal output of the low-pass filter 13 is assumed to contain a time axis variation component $\Delta f$, that is, the sub-carrier frequency of this output is assumed to be $(f_s + \Delta f)$. This output is frequency converted in the frequency converter 16 with an output signal from the crystal oscillator 16 (oscillating at $f_c$, the same frequency as the original sub-carrier frequency), and the resultant output $(f_c + f_s + \Delta f)$ is led to the burst signal separator 18 to separate the burst signal and is then led to the phase comparator 21. The frequency and phase of the variable frequency oscillator 20 are controlled by the error signal voltage produced by the comparison of the burst signal and the continuous signal A. In the instant embodiment, the variable frequency oscillator 20 is constructed in such a way that its self-running frequency is $(n/m)f_s$ (where $m$ and $n$ are integers and $m<n$), and its output signal B is coupled to an $n/m$ frequency divider 25 to produce a continuous signal C at frequency $f_s$. This signal C is heterodyned with the signal from the crystal oscillator 17 in the frequency converter 19 to obtain the continuous signal A at frequency $(f_c + f_s)$. In the balanced state, the frequency of the continuous signal A is $(f_c + f_s + \Delta f)$. In this state, the frequency of the continuous signal C is thus $(f_s + \Delta f)$, and the frequency of the continuous signal B is $n/m(f_s + \Delta f)$. In comparison with the case of FIG. 1, where the relations of equations 1 and 2 hold by denoting the phase comparison sensitivity by $\mu$(V/rad.), the frequency variation sensitivity by $\beta$(Hz/V), the phase difference between the burst signal and continuous signal A by $\Delta\phi$(rad.) and the error signal voltage by $\Delta E$(V); while in the case of FIG. 3 according to the invention, although the phase comparison sensitivity is the same, i.e., $\mu$(V/rad.), with the phase comparator as in the case of FIG. 1, the frequency variation sensitivity is $(n/m)^2\beta$ since the oscillation frequency of the oscillator 20 is $(n/m)\cdot f_s$ as is seen from equation 4. Thus, the phase comparison error voltage is $$\frac{n}{m} \Delta f \div \left( \frac{n}{m} \right)^2 \beta = \frac{\Delta f}{\beta} \cdot \frac{m}{n} = \frac{m}{n} \Delta E$$

and the phase difference between the burst signal and continuous signal A is $$\frac{m}{n}\Delta E \div \mu = \frac{\Delta E}{\mu} \cdot \frac{m}{n} = \frac{m}{n}\Delta\phi$$

In this way, we may have as the APC loop gain $$\Delta f \div \frac{m}{n}\Delta\phi = \frac{n}{m} \cdot \frac{\Delta f}{\Delta\phi} = \frac{n}{m}\mu\beta$$

which is $n/m$ times the value in the case of FIG. 1.

By using the continuous signal A thus obtained for converting the reproduced frequency converted chrominance signal at sub-carrier frequency ($f_s + \Delta f$) in the frequency converter 22 the original chrominance signal at a sub-carrier frequency $f_c$ free from time axis variation component can be recovered. Since in this case the self-running frequency $(n/m)f_s$ of the APC oscillator is divided by $n/m$ in the frequency divider 25 into $f_s$ for heterodyning with the steady crystal oscillator signal at $f_c$, the same temperature stability as in the prior-art arrangement can be ensured, while increasing the APC loop gain by $n/m$ times to obtain improved time axis variation cancellation characteristics.

Figure 4:
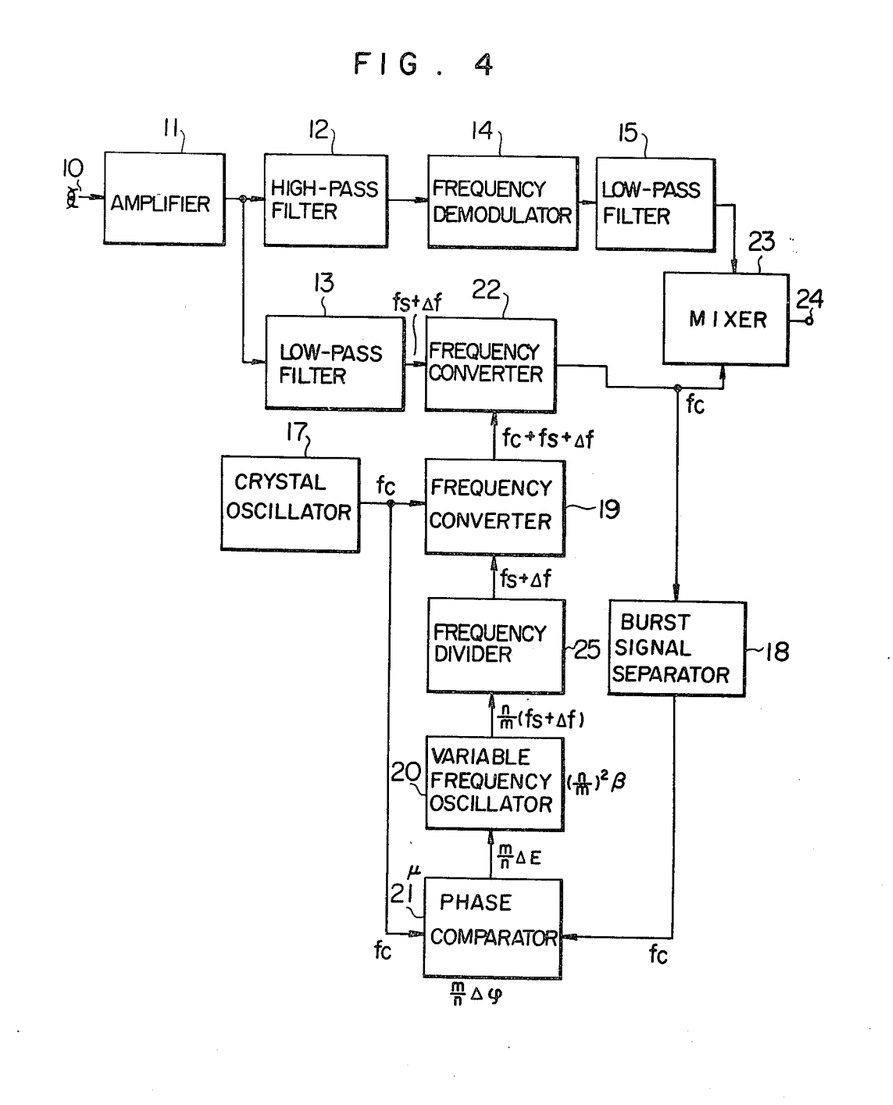

FIG. 4 shows another embodiment of the invention, in which the burst signal extracted from the reproduced chrominance signal made free from time axis variation component is phase compared with the reference frequency oscillator signal. In the Figure, like reference numerals designate like parts in the previous embodiment of FIG. 3. Here, the signal of the crystal oscillator 17 oscillating at frequency $f_c$ is phase compared with the burst signal extracted by burst signal separator 18 from the reproduced frequency converted chrominance signal in phase comparator 21. The error voltage output $m/n\cdot\Delta E$ of the phase comparator 21 is used to control the frequency and phase of a variable frequency oscillator 20, whose output signal (at $n/m(f_s + \Delta f)$) is frequency divided by an $n/m$ frequency divider into ($f_s + \Delta f$) for heterodyning the signal of the crystal oscillator 17 to obtain a continuous signal at ($f_c + f_s + \Delta f$), which is in turn used to heterodyne the reproduced frequency converted chrominance signal at ($f_s + \Delta f$) in the frequency converter 22, thereby obtaining the original chrominance signal at sub-carrier frequency $f_c$ made free from time axis variation component. In this case again, as in the case of FIG. 3, the APC loop gain can be made to be $n/m$ times that in the case of FIG. 1 without deteriorating the temperature stability.

While the preceding embodiments of FIGS. 3 and 4 have been concerned with the method of increasing the APC loop gain without deteriorating the temperature stability, in accordance with the invention it is also possible to better the temperature stability without sacrifice in or together with the APC loop gain.

Figure 5:
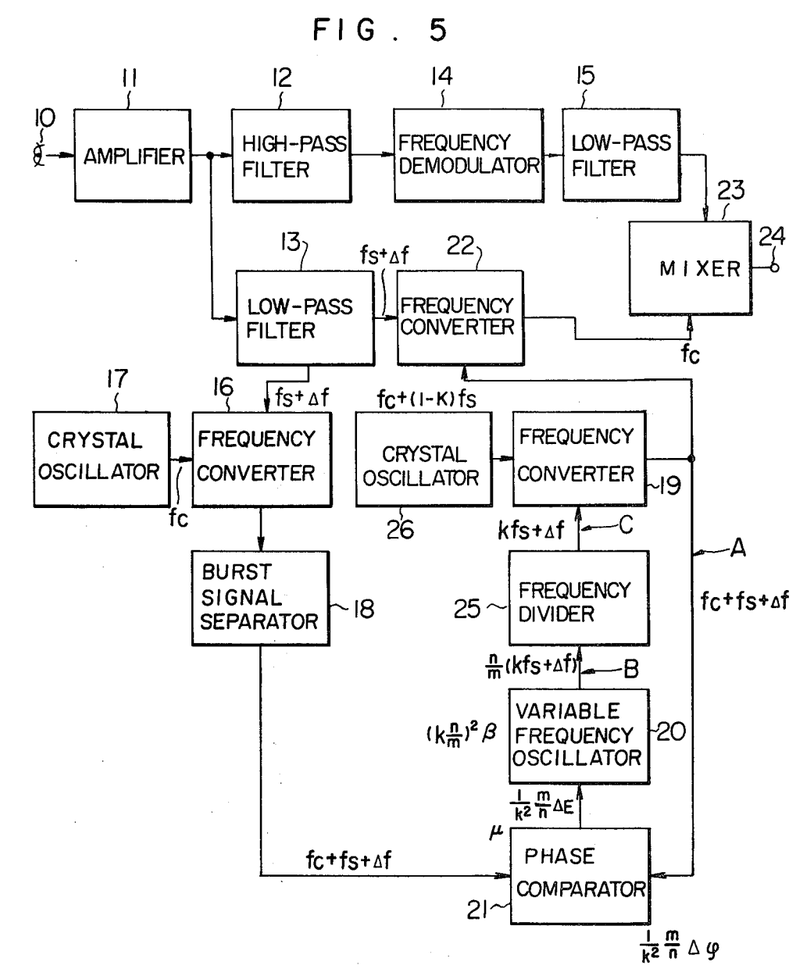
Figure 6:
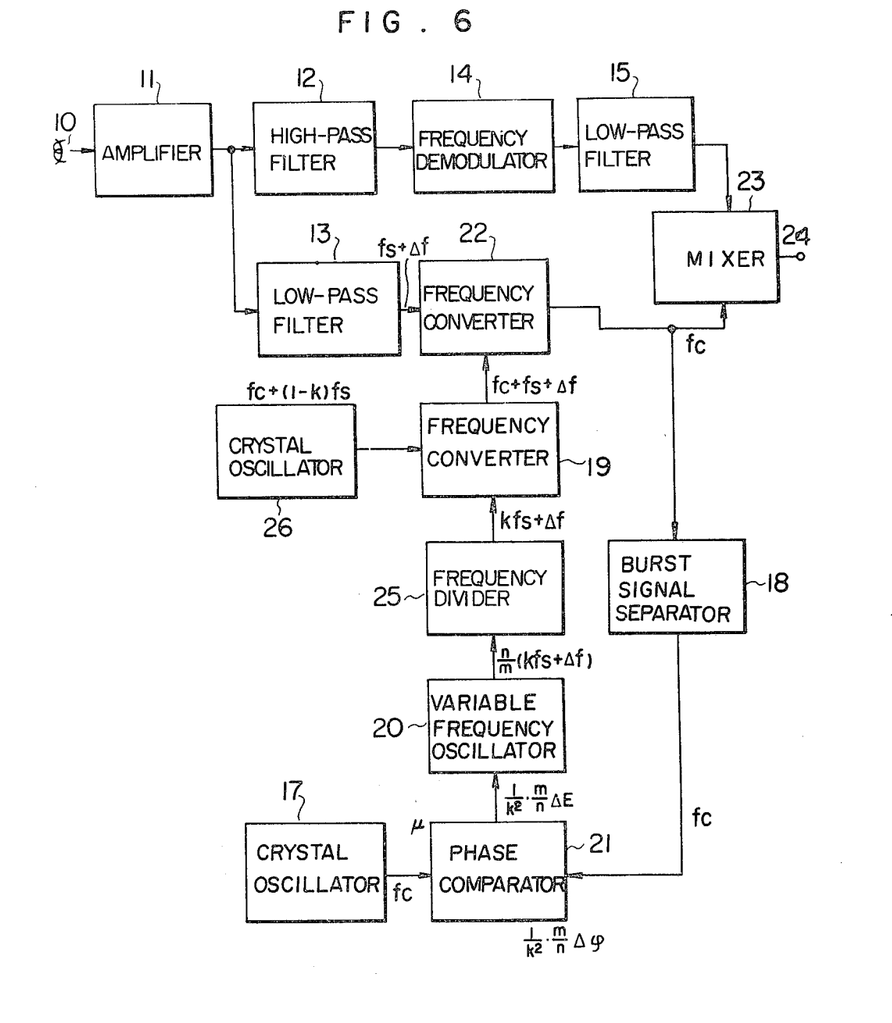

FIGS. 5 and 6 show further embodiments (showing only the reproducing systems thereof), which are intended to this end. In these Figures, like reference numerals up to 25 designate like parts in the previous embodiments of FIGS. 3 and 4. In basic construction, the embodiments of FIGS. 5 and 6 are similar to the respective previous embodiments of FIGS. 3 and 4, except that a steady oscillator 26 oscillating at a frequency of $f_c + (1 - k)f_s$, (with $k<1$), is additionally provided.

The afore-mentioned effect of the invention will now be made apparent in connection with the embodiment of FIG. 5. The same symbols as those used in connection with FIG. 3 are used here again. Here, the recording system and the reproduced luminance signal processing system are the same as in the preceding embodiments. The APC loop function is also similar to that of FIG. 3, except that the variable frequency oscillator 20 is constructed in such a way that its self-running frequency is $k(n/m)f_s$ (where $m$ and $n$ are integers, $m<n$ and $k<1$). The output signal B from the oscillator 20 is coupled to an $n/m$ frequency divider to produce a continuous signal C at frequency $kf_s$ and this signal is heterodyned with the signal from the crystal oscillator 26 oscillating at frequency $f_c + (1 - k)f_s$ in the frequency converter 19 to obtain a continuous signal A at frequency $f_c + f_s$. In the balanced state, the frequency of the continuous signal A is $f_c + f_s + \Delta f$. In this state, the frequency of the continuous signal C is $kf_s + \Delta f$, and the frequency of the continuous signal B is $(n/m)kf_s + \Delta f$). In this case, the phase comparison sensitivity of the phase comparator 21 is $\mu$(V/rad.), and the frequency variation sensitivity of the variable frequency oscillator 20 is $(kn/m)^2\beta$ as is apparent from equation 4. Thus, the phase comparison error voltage is, from equations 1 and 2, $$\frac{n}{m}\Delta f \div \left(k\frac{n}{m}\right)^2\beta = \frac{\Delta f}{\beta}\cdot\frac{1}{k^2}\cdot\frac{m}{n} = \frac{1}{k^2}\cdot\frac{m}{n}\Delta E$$

and the phase difference between the burst signal and continuous signal A is $$\frac{1}{k^2}\cdot\frac{m}{n}\cdot\Delta E \div \mu = \frac{\Delta E}{\mu}\cdot\frac{1}{k^2}\cdot\frac{m}{n} = \frac{1}{k^2}\cdot\frac{m}{n}\Delta\phi$$

so that the APC loop gain is $$\Delta f \div \frac{1}{k^2}\cdot\frac{m}{n}\cdot\Delta\phi = k^2\cdot\frac{n}{m}\cdot\frac{\Delta f}{\alpha\phi} = k^2\frac{n}{m}\mu\beta$$

which is $k^2\cdot(n/m)$ times the value in the case of FIG. 1.

The temperature stability will now be discussed. With a construction such as that of FIG. 1 the temperature stability of the APC loop depends upon the temperature variation of the oscillation frequency of the variable frequency oscillator 20 as mentioned earlier. In this case, the amount of change of the oscillation frequency (self-running frequency being $f_s$) is identical with the amount of total change of frequency in the APC loop due to the change of temperature. That is, providing the former amount equal to $x$(kHz), the latter amount also becomes $x$(kHz). However, with the construction of FIG. 5 according to the invention, in response to the same temperature change as in the preceding case, the frequency variation in the variable frequency oscillator 20 is $k\cdot(n/m)\cdot x$ since the self-running frequency is $k\cdot(n/m)f_s$, whereas the total frequency variation in the APC loop is $k\cdot x$ since the frequency of the oscillator 20 is divided by $n/m$. As $k$ is selected so that $k<1$, in the embodiment of FIG. 5 the temperature stability (variation) of the APC improves by $k$ as compared to in the case of FIG. 1.

For example, by setting $k=0.5$ and $m/n=\frac{1}{4}$, the loop gain is $0.5^2 \times 4 = 1$, and the temperature stability is 0.5. In this way, the frequency variation due to temperature variation can be reduced to one half compared to the case of FIG. 1 while the loop gain remains equal. In this case, the oscillation frequency of the crystal oscillator 26 is $f_c + 0.5f_s$. Also, by appropriately selecting the values of $k$ and $m/n$ it is possible to better both loop gain and temperature stability.

As in the previous embodiment of FIG. 3, by using the continuous signal A thus obtained for converting the reproduced frequency converted chrominance signal at sub-carrier frequency $f_s + \Delta f$ through heterodyning in the frequency converter 22 the original chrominance signal at sub-carrier frequency $f_c$ and free from time axis variation component can be recovered.

The embodiment of FIG. 6 aims to obtain the same effects as in the preceding embodiment of FIG. 5 in a time axis variation component cancellation system basically having the same construction as the embodiment of FIG. 4.

As has been described in the foregoing, according to the invention in the APC heterodyne system for removing time axis variation component it is possible to improve the APC loop gain without deteriorating the temperature characteristics of the loop or to improve the temperature characteristics without sacrifice in or together with the loop gain, thus permitting the obtaining of time axis variation cancellation characteristics superior to what has heretofore been available. If the invention is applied to a system for recording and reproducing a PAL color television signal, instability of APC peculiar to the PAL signals can be improved to obtain a better and more stable APC function. Also, when applied to a system for recording and reproducing an NTSC color television signal, better and steadier characteristics than the heretofore obtainable characteristics can be realized. While in the foregoing description the stability of the oscillation frequency of the APC oscillator has been discussed with respect to temperature, the principles underlying the invention may of course apply to variations of the oscillation frequency due to factors other than temperature change as well. Further, while the variable frequency oscillator described above has been of the LC type, more particularly a variable capacitance type based on frequency and phase control, it will be apparent that other types of oscillators may be adopted in accordance with the invention, and the way of varying the reactance may be desirably selected to suit any combination of inductive, capacitive, reactive and other elements.

What we claim is:

1. A system for recording and reproducing a color television signal comprising means for obtaining a burst signal from a reproduced frequency converted chrominance signal; a variable frequency oscillator to produce a first continuous signal, said burst signal controlling the frequency and phase of said first continuous signal; means for dividing the frequency of said first continuous signal by $n/m$ where $m$ and $n$ are integers and $m<n$, to produce a second continuous signal; a stable fixed frequency oscillator for producing a third steady continuous signal; means for heterodyning said second continuous signal and said third steady continuous signal to produce a fourth continuous signal having a frequency equal to the sum of the frequencies of said second and third signals; and means for heterodyning said reproduced frequency converted chrominance signal with said fourth continuous signal to thereby recover the original chrominance signal free from a time axis variation component.

2. The system for recording and reproducing a color television signal according to claim 1, wherein said third steady continuous signal has the same frequency as the color sub-carrier frequency.

3. The system for recording and reproducing a color television signal according to claim 1, wherein said third steady continuous signal has a frequency slightly higher than the color sub-carrier frequency.

4. A system for recording and reproducing a color television signal, in which the recording is made by frequency modulating the luminance signal, frequency converting the chrominance signal to shift the same into a lower frequency range and combining the frequency modulated luminance signal and frequency converted chrominance signal, and which comprises a first reference frequency oscillator having a frequency equal to the color sub-carrier frequency; means for obtaining a burst signal from the reproduced chrominance signal reproduced by heterodyning said frequency converted chrominance signal and a steady signal from said first reference frequency oscillator; and APC circuit for obtaining a continuous signal frequency phase locked to said burst signal, said APC circuit including means for phase comparing said burst signal and said continuous signal to produce a phase error signal, a variable frequency oscillator which is frequency and phase controlled by said phase error signal, a frequency divider for dividing the output frequency of said variable frequency oscillator by $n/m$ where $m$ and $n$ are integers and $m<n$, a second reference frequency oscillator, means for heterodyning the output signal of said frequency divider with said second reference frequency oscillator; and means for heterodyning said frequency converted chrominance signal and said continuous signal to recover the original chrominance signal free from a time axis variation component.

5. The system for recording and reproducing a color television signal according to claim 4, wherein the self-running frequency of said variable frequency oscillator is $n/m$ times the sub-carrier frequency of said frequency converted chrominance signal, and also wherein said second steady oscillator oscillates at the same frequency as the color sub-carrier frequency.

6. The system for recording and reproducing a color television signal according to claim 4, wherein the self-running frequency of said variable frequency oscillator is $(n/m)k$ times the sub-carrier frequency of said frequency converted chrominance signal ($k<1$), and also wherein said second steady oscillator oscillates at a frequency higher than the color sub-carrier frequency by $(1 - k)$ times the sub-carrier frequency of said frequency converted chrominance signal.

7. A signal processing system comprising:
means for reproducing a recorded chrominance signal having a frequency converted to a low frequency range,
a stable fixed frequency oscillator,
means for extracting a burst signal from the reproduced chrominance signal and heterodyning said burst signal with an output from said stable fixed frequency oscillator to produce a second burst signal of higher frequency,
a variable frequency and phase oscillator, the frequency and phase of said oscillator being controlled by an applied control signal,
a frequency divider for dividing the output frequency of said variable frequency and phase oscillator by $n/m$, where $m$ and $n$ are integers and $m<n$, means for heterodyning an output of said frequency divider with the output of said stable fixed frequency oscillator to produce a first signal of higher frequency, a phase comparator for comparing the phase of said second burst signal with the phase of said first signal to produce a signal representing the phase difference therebetween, means for applying the output of said phase comparator to said variable frequency and phase oscillator as said control signal, and means for heterodyning said first signal with said reproduced chrominance signal to recover the original chrominance signal free from a time axis variation component.

8. A signal processing system comprising:

means for reproducing a recorded chrominance signal having a frequency converted to a low frequency range, means for heterodyning the reproduced chrominance signal with an applied first signal to produce a second chrominance signal having a standard frequency free from time axis variation, means for extracting a burst signal from said second chrominance signal, a stable fixed frequency oscillator, a phase comparator for phase comparing the output of said stable fixed frequency oscillator with said burst signal to produce a signal representing the phase difference therebetween, a variable frequency and phase oscillator, the frequency and phase of said variable oscillator being controlled in response to the output of said phase comparator, a frequency divider for dividing the output frequency of said variable frequency and phase oscillator by $n/m$, where $m$ and $n$ are integers and $m<n$, and a frequency converter for heterodyning the output of said frequency divider with the output of said first fixed frequency oscillator for producing said first signal.

9. A signal processing system comprising:

means for reproducing a recorded chrominance signal having a frequency converted to a low frequency range, means for heterodyning the reproduced chrominance signal with an applied first signal to convert to a second chrominance signal having a standard frequency free from time axis variation, means for extracting a burst signal from said second chrominance signal, a first stable fixed frequency oscillator, a phase comparator for phase comparing the output of said first stable fixed frequency oscillator with said burst signal to produce a signal representing the phase difference therebetween, a variable frequency and phase oscillator, the frequency and phase of said variable oscillator being controlled in response to the output of said phase comparator, a frequency divider for dividing the output frequency of said variable frequency and phase oscillator by $n/m$, where $m$ and $n$ are integers and $m<n$, a second stable fixed frequency oscillator, and a frequency converter for heterodyning the output of said frequency divider with the output of said second stable fixed frequency oscillator to produce said first signal.

10. A signal processing system according to claim 9, wherein the self-running frequency of said variable frequency and phase oscillator is $n/m$ times as high as the sub-carrier frequency of said frequency converted chrominance signal, and wherein said second fixed frequency oscillator oscillates at the same frequency as the color sub-carrier frequency.

11. A signal processing system according to claim 9, wherein the self-running frequency of said variable frequency and phase oscillator is $(n/m)k$ times as high as the sub-carrier frequency of said frequency converted chrominance signal, where $k<1$, and said second fixed frequency oscillator oscillates at a frequency which is higher than said color sub-carrier frequency by $(1-k)$ times said sub-carrier frequency of said frequency converted chrominance signal.

* * * * *